US009845872B2

(12) United States Patent
Dunning et al.

(10) Patent No.: US 9,845,872 B2
(45) Date of Patent: Dec. 19, 2017

(54) GAITER

(71) Applicant: Jaguar Land Rover Limited, Coventry (GB)

(72) Inventors: Emma-Claire Dunning, Coventry (GB); Edward Hoare, Coventry (GB); Maelle Dodu, Coventry (GB); Laur Läänemets, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 81 days.

(21) Appl. No.: 14/917,161

(22) PCT Filed: Sep. 12, 2014

(86) PCT No.: PCT/EP2014/069500
§ 371 (c)(1),
(2) Date: Mar. 7, 2016

(87) PCT Pub. No.: WO2015/036542
PCT Pub. Date: Mar. 19, 2015

(65) Prior Publication Data
US 2016/0208918 A1     Jul. 21, 2016

(30) Foreign Application Priority Data

Sep. 12, 2013    (GB) .................................. 1316250.8

(51) Int. Cl.
*F16J 3/04*      (2006.01)
*B60C 23/00*    (2006.01)
(Continued)

(52) U.S. Cl.
CPC ............. *F16J 3/046* (2013.01); *B60C 23/003* (2013.01); *F16D 3/845* (2013.01); *F16J 3/041* (2013.01);
(Continued)

(58) Field of Classification Search
CPC ...... F16J 3/046; F16J 3/041; F16J 3/04; F16J 3/042; F16D 3/845; F16D 3/223;
(Continued)

(56) References Cited

U.S. PATENT DOCUMENTS 3,381,987 A     5/1968   Husen
4,579,046 A *   4/1986   Meijer .................. F02G 1/0535
                                                                                                                                       277/504
(Continued)

FOREIGN PATENT DOCUMENTS

DE       21 65 811 A1    7/1973
DE       27 14 983 A1    10/1978
(Continued)

OTHER PUBLICATIONS

Combined Search and Examination Report, GB 1316250.8, dated Mar. 20, 2014, 6 pages.
(Continued)

*Primary Examiner* — S. Joseph Morano
*Assistant Examiner* — Jean Charleston
(74) *Attorney, Agent, or Firm* — Myers Bigel, P.A.

(57) ABSTRACT

A gaiter (4) for a lubricated joint (1) comprises a sidewall structure (9) defining an enclosure (5) for receiving a lubricant and a passageway (24) for conveying a gas. In use, the passageway (12) conveys gas in isolation from said enclosure (5). Gaiters (4) in accordance with the invention find application in vehicle central tire inflation systems (CTIS).

17 Claims, 1 Drawing Sheet

(51) Int. Cl.
*F16D 3/84* (2006.01)
*F16D 3/223* (2011.01)

(52) U.S. Cl.
CPC ........ *F16D 3/223* (2013.01); *F16D 2003/846* (2013.01)

(58) Field of Classification Search
CPC ............. F16D 2003/846; B60C 23/003; Y10T 403/31; Y10T 403/315; Y10T 464/10
USPC ................ 152/415, 416, 417; 464/173, 175; 277/634, 635, 636; 403/50, 51
See application file for complete search history.

(56) References Cited

U.S. PATENT DOCUMENTS

| | | | |
|---|---|---|---|
| 5,145,191 A | | 9/1992 | Stewart et al. |
| 6,095,712 A | * | 8/2000 | Ridley ................... B60G 7/005 188/264 G |
| 8,287,393 B2 | * | 10/2012 | Dao ........................ F16D 3/226 464/173 |
| 2006/0199653 A1 | | 9/2006 | Terashima |
| 2006/0231184 A1 | * | 10/2006 | Beverly ................ B60C 23/003 152/417 |
| 2012/0067482 A1 | * | 3/2012 | Stech .................... B60C 23/003 152/415 |

FOREIGN PATENT DOCUMENTS

| | | |
|---|---|---|
| DE | 296 13 006 U1 | 10/1996 |
| JP | H10325421 A | 12/1998 |
| WO | WO 2012/071579 A1 | 5/2012 |

OTHER PUBLICATIONS

Notification of Transmittal of the International Search Report and the Written Opinion, PCT/EP2014/069500, dated Apr. 30, 2015, 15 pages.

Communication pursuant to Article 94(3) EPC, EPO Application No. 14766160.7, Sep. 7, 2017, 5 pp.

* cited by examiner

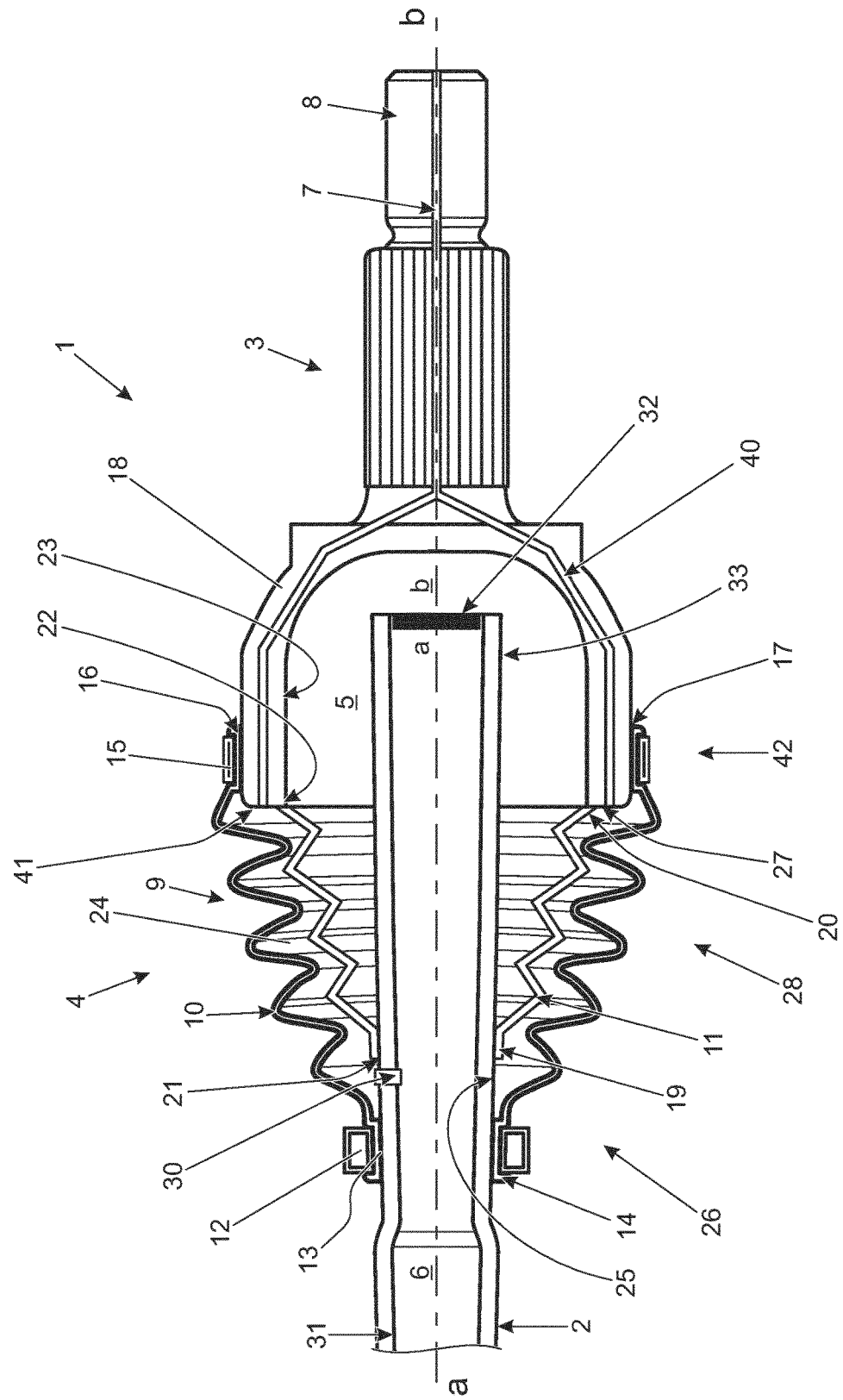

GAITER

RELATED APPLICATIONS

This application is a 35 U.S.C. §371 national stage application of PCT Application No. PCT/EP2014/069500, filed on Sep. 12, 2014, which claims priority from Great Britain Patent Application No. 1316250.8 filed on Sep. 12, 2013, the contents of which are incorporated herein by reference in their entireties. The above-referenced PCT International Application was published in the English language as International Publication No. WO 2015/036542 A2 on Mar. 19, 2015.

TECHNICAL FIELD

The present disclosure relates to a gaiter for a lubricated joint. In particular, but not exclusively, aspects of the present invention relate to a gaiter for a lubricated joint for a central tyre inflation system (CTIS); to a hollow vehicle axle shaft; to a hollow wheel stub axle; to a vehicle axle assembly; to an articulated joint; to a CTIS; and to a vehicle.

BACKGROUND OF THE INVENTION

The present invention was conceived in the context of on-board central tyre inflation systems (CTISs). CTISs were originally developed for military applications, in particular for military applications concerning off-road military wheeled trucks and trailers. However, CTISs are nowadays incorporated into non-military vehicles such as specialist construction equipment and some agricultural vehicles.

CTIS typically comprises one or more compressed air sources located on-board the vehicle and connected to one or more tyres. Tyre pressure can therefore be adjusted by operating the CTIS. Typically, CTISs provide for delivery of compressed air to a tyre supply line. In some examples, the supply line is integrated into a vehicle axle. Some axles comprise articulated joints having a driveshaft and a stub axle connected to form a constant velocity (CV) joint, and the compressed air supply line extends through the CV joint. An example of such an axle is described in US 2012/0067482 A1, to Mr Clyde Stech of Fleet Air, LLC. The CV joint is typically protected by a CV joint gaiter.

Air supplied through the CV joint to inflate or deflate the tyre may leak into the CV joint enclosure delimited by the gaiter and can thus pressurize and inflate the gaiter. This is not desirable, and vented gaiters have been proposed to equalise pressure. WO 2010/039244 A1 discloses a clamping assembly for venting an enclosure having openings extending from the inside of the enclosure to the outside of the enclosure.

It is against this background that the present invention has been conceived. In at least certain embodiments, the present invention seeks to address shortcomings associated with the prior art or to improve parts, components, apparatus, systems and methods disclosed in the prior art.

SUMMARY

Aspects of the invention relate to a gaiter for a lubricated joint; to a hollow vehicle axle shaft; to a hollow wheel stub axle; to a vehicle axle assembly; to an articulated joint; to a CTIS; and to a vehicle.

According to an aspect of the present invention, there is provided a gaiter for a lubricated joint, the gaiter comprising:

an inner sidewall defining a volume for receiving a lubricated joint,
an outer sidewall; and
a passageway formed between the inner and outer sidewalls for conveying a gas;
wherein the passageway is configured to convey gas in isolation from said volume when the gaiter is mounted to the lubricated joint.

The passageway can extend from a first gas flow port. The gas flow port can be located at or near a first end of the gaiter. The passageway can extend to a second gas flow port located at or near a second end of the gaiter. The first and second gas flow ports may be defined on or around respective first and second inner surfaces of first and second cuffs each configured to seal around outer surfaces of said lubricated joint.

The outer sidewall can comprise a first rim configured to be mounted to a first outer surface of the lubricated joint. The inner sidewall can comprise a second rim configured to be mounted to a second outer surface of the lubricated joint. The first rim and the second rim can converge and/or merge to form the first cuff. The outer sidewall can comprise a third rim configured to be mounted to a third surface of the lubricated joint. The third rim can be located at an opposite end of the gaiter and/or of the outer sidewall compared to the first rim. The inner sidewall can comprise a fourth rim configured to be mounted to a fourth surface of the lubricated joint. The fourth rim can be located at an opposite end of the gaiter and/or the inner sidewall compared to the second rim. Said ends can be distal ends of the gaiter.

At least one of said gas flow ports can be configured to receive the gas generally radially with respect to a longitudinal axis defined by the gaiter. However, alternative configurations are possible. For example, the gas flow port can be configured to receive the gas generally axially, i.e. according to a direction generally parallel with respect to the longitudinal axis defined by the gaiter.

The passageway can be defined between an inner surface of the outer sidewall and an outer surface of the inner sidewall. An inner surface of the inner sidewall can define the volume for receiving the lubricant.

The inner sidewall can be removably disposed within the outer sidewall. However, the inner sidewall can alternatively be provided integrally with the outer sidewall. For example, the inner sidewall can be formed integrally with the outer sidewall, or can be otherwise permanently connected to the outer sidewall.

At least one of the outer and inner sidewalls can be pleated or convoluted. At least one of the outer and inner walls can be formed from a sheet made of a flexible polymeric material, for example rubber. If both the outer and inner sidewalls are convoluted or pleated, the convolutions of the inner sidewall can be provided in correspondence with convolutions of the outer sidewall so that the passageway is not restricted or, in other words, the cross-sectional area of the passageway is kept constant or substantially constant along the passageway.

In some embodiments, a compressed gas, for example compressed air, can flow through the passageway. At least one of the outer and inner sidewalls can comprise a sidewall reinforcing element. Within a certain pressure limit, therefore, a reinforced wall can maintain an unchanged or substantially unchanged shape under the action of said pressure. The outer and inner sidewalls can be at least substantially coaxially disposed with respect to said longitudinal axis defined by the gaiter.

According to another aspect of the present invention, there is provided a hollow vehicle axle shaft for a central tyre inflation system (CTIS), the shaft comprising a conduit for passage of a gas extending longitudinally through said shaft; a shaft outer wall; wherein a through bore is provided through said shaft outer wall, said bore being in fluid communication with the conduit.

The bore can extend at least substantially radially through said shaft outer wall.

The shaft can be a driveshaft.

According to another aspect of the present invention, there is provided a hollow wheel stub axle for a central tyre inflation system (CTIS), the stub axle comprising:
- a cup-shaped portion; and
- a shaft portion comprising a conduit for passage of a gas extending longitudinally through said shaft portion;
- wherein the cup-shaped portion comprises a gallery for receiving the gas, said gallery being in fluid communication with said conduit.

The gallery can be configured to receive the gas substantially parallel with respect to said shaft portion or substantially parallel with respect to a longitudinal axis defined by said shaft portion.

The gallery can extend through a rim region defined by said cup-shaped portion.

The rim region can comprise longitudinally extending bearing grooves separated by groove separation areas, a radial thickness of said rim region measured in correspondence of said groove separation areas being greater than a radial thickness of said rim region measured in correspondence of one or more of the bearing grooves. The gallery can extend at least partially through one of said groove separation areas.

In some embodiments, the cup-shaped portion comprises a plurality of galleries each extending through a corresponding groove separation area.

According to another aspect of the present invention, there is provided a vehicle axle assembly for a central tyre inflation system (CTIS), the assembly comprising:
- a gaiter as described herein; and
- a hollow vehicle axle shaft as described herein.

The passageway can be in fluid communication with the through bore. The first rim of the outer sidewall can be mounted to a first outer surface of the shaft. The second rim of the inner sidewall can be mounted to a second outer surface of the shaft. The through bore can be located between said first and second outer surfaces of the shaft. Alternatively, the first cuff can be mounted to an outer surface of the shaft and the through bore can be located on said outer surface of the shaft.

According to another aspect of the present invention, there is provided a vehicle axle assembly for a central tyre inflation system (CTIS), the assembly comprising:
- a gaiter as described herein; and
- a hollow wheel stub axle as described herein.

The passageway can be in fluid communication with the or each gallery.

The third surface of the lubricated joint can be provided on the cup-shaped portion of the stub axle. The outer sidewall can cooperate with said third surface. In particular, the third rim of the outer sidewall can be mounted to said third surface. The fourth surface of the lubricated joint can also be provided on the cup-shaped portion of the stub axle. The inner sidewall can cooperate with said fourth surface. In particular, the fourth rim of the inner sidewall can be mounted to said fourth surface. Said third surface can be an external surface of the cup-shaped portion of the stub axle. The fourth rim of the inner sidewall can be mounted to said fourth surface. Said fourth surface can be external or internal. A lip can be provided on the cup shaped portion of the stub axle for mounting the inner sidewall thereon. The lip can protrude from an edge of the cup-shaped portion. Said edge can be an inner edge of the cup-shaped portion. Alternatively, the second cuff can be mounted to an external surface of the cup shaped portion of the wheel stub axle and the or each gallery can be located on said external surface of the cup-shaped portion of the wheel stub axle.

According to another aspect of the present invention, there is provided an articulated joint for a central tyre inflation system (CTIS), the joint comprising:
- first and second hollow vehicle axles having, respectively, a first and a second internal conduit for passage of a gas; and
- a gaiter as described herein.

The passageway of the gaiter can be in fluid communication with each of the first and second internal conduits.

The first hollow vehicle axle can be a driveshaft. The driveshaft can be as described herein. The second hollow vehicle axle can be a wheel stub axle. The wheel stub axle can be as described herein. The driveshaft and the stub axle can form a constant velocity (CV) joint.

According to another aspect of the present invention, there is provided a CTIS comprising a hollow vehicle axle shaft as described herein, and/or a hollow wheel stub axle as described herein, and/or a vehicle axle assembly as described herein, and/or an articulated joint as described herein.

According to another aspect of the present invention, there is provided a vehicle comprising a CTIS as described herein.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying FIGURE, in which:

FIG. 1 is a cross sectional side elevation of a constant velocity (CV) joint according to an embodiment of the present invention.

DETAILED DESCRIPTION OF AN EMBODIMENT

A constant velocity (CV) joint 1 adapted for internal passage of compressed air will now be described with reference to the drawings. The CV joint 1 is part of a vehicle central tyre inflation system (CTIS). The CTIS allows a driver to inflate a tyre mounted on a wheel connected to the CV joint 1 from on-board the vehicle. The CTIS, tyre and wheel are not shown in the drawings and are of the type described in the co-pending patent application number GB1313622.1 filed on 30 Jul. 2013, the contents of which are incorporated herein in their entirety by reference.

With reference to FIG. 1, the CV joint 1 is formed by a hollow driveshaft 2 coupled to a hollow wheel stub axle 3. A CV joint gaiter 4 creates a CV joint enclosure 5 for receiving CV joint inner components (bearings, cage, any spacers etc.) and a lubricant, such as grease, for lubricating said inner components. The inner components of the CV joint 1, and the lubricant, are not shown in FIG. 1 for clarity of representation.

A first internal conduit 6 is formed through the driveshaft 2. A second internal conduit 7 is formed through a shaft portion 8 of the wheel stub axle 3. During a tyre inflation operation, compressed air is received by the first internal conduit 6, and is allowed out of the CV joint 1 through the second internal conduit 7.

The gaiter 4 has a sidewall structure 9 formed by an outer sidewall 10 and an inner sidewall 11. The inner sidewall 11 is disposed coaxially within the outer sidewall 10. A first gaiter clamp 12 clamps a first rim 13 of the outer sidewall 10 around a first designated external surface 14 of the driveshaft 2. The inner sidewall 11 has a second rim 19 coupled to a designated surface of driveshaft 2. A second gaiter clamp 15 clamps a third rim 16 of the outer sidewall 10 around a designated external surface 17 of a cup-shaped portion 18 of the stub axle 3. The inner sidewall 11 has a fourth rim 20 coupled to a designated surface of the cup-shaped portion 18. More specifically, in the described embodiment, the second rim 19 of the inner sidewall 11 is coupled to a second designated external surface 21 of the driveshaft 2, and the fourth rim 20 of the inner sidewall 11 is coupled to an inner edge 22 of the cup-shaped portion 18. Alternative coupling locations are however possible. For example, the fourth rim 20 of the inner sidewall 11 can be coupled to a designated internal surface 23 of the cup-shaped portion 18 of the wheel stub axle 3. If a protruding lip is provided protruding inwardly from the inner edge 22, the fourth rim 20 of the inner sidewall 11 could be coupled to said lip, on an inner or outer side thereof. Furthermore, embodiments where both the fourth rim 20 of the inner sidewall 11 and the third rim 16 of the outer sidewall 10 are coupled to designated external surfaces of the cup-shaped portion 18 of the wheel stub axle 3 are also possible. In the latter embodiments, the third rim 16 of the outer sidewall 10 is coupled further out-board with respect to the fourth rim 20 of the inner sidewall 11. Coupling means to provide the aforementioned couplings of said second and fourth rims 19, 20 of the inner sidewall 11 are not shown in the drawings.

In an alternative embodiment (not shown in the FIGURE), the inner and outer sidewalls 10, 11 can converge or merge at one end of the gaiter 4 to form a first shared rim, or cuff, which has a port or outlet arranged to fluidly couple the internal passageway 24 to the first internal conduit 6 of the driveshaft 2. Likewise, the inner and outer sidewalls 10, 11 can converge or merge at the other, opposite end of the gaiter 4 to form a second shared rim, or cuff, which has a port or outlet arranged to fluidly couple the internal passageway 24 to the second internal conduit 7 of the wheel stub axle 3. These ports or outlets on the first and second cuffs can be obtained via suitable side drillings. The fluid connections are provided by clamping the first and second cuffs to, respectively, the driveshaft 2 and the wheel stub axle 3. This would not require careful seating of the inner sidewall 11 and the outer sidewall 10 on the driveshaft 2 and the wheel stub axle 3.

The outer and inner sidewalls 10, 11 of said sidewall structure 9 are spaced apart from each other and define an internal passageway 24 for flow of compressed air. The inner surface of the inner sidewall 11 defines a portion of the enclosure 5 for receiving the lubricant and accommodating the bearings of the CV joint. The inner surface of the inner sidewall 11 is in contact with the lubricant which is kept separated and isolated from the compressed air. The passageway 24 extends from a first flow port 25 located near an in-board end 26 of the gaiter 4 to a second flow port 27 located at an out-board end 28 of the gaiter 4. The first flow port 25 is in fluid communication with a radial through bore 30 machined into a shaft outer wall 31. The second flow port 27 is in fluid communication with a set of galleries 40 machined in the cup-shaped portion 18 of the wheel stub axle 3. During tyre inflation, the first flow port 25 is oriented so as to accept compressed air flow generally radially with respect to a driveshaft main longitudinal axis a-a. The second flow port 27 is oriented so as to deliver compressed air flow generally parallel to a stub axle longitudinal axis b-b.

A hollow shaft end plug 32 closes the first internal conduit 6 at an out-board end 33 of the driveshaft 2. The second internal conduit 7 does not open into the enclosure 5 for the lubricant but only communicates with the passageway 24 via the galleries 40 and second port 27. Therefore, during a tyre inflation operation, compressed air passes first through the first internal conduit 6; then through the radial through bore 30; from there, into the first gaiter port 25; through the passageway 24; through the second flow port 27; from there, through the galleries 40; through the second internal conduit 7; and, from there, out of the CV joint 1, to the tyre.

FIG. 1 only shows an in-board end 33 of the driveshaft 2. The hollow shaft end plug 32 is located at this end 33 of the driveshaft 2. It will be appreciated, however, that the driveshaft 2 also has an in-board end which is not shown in the drawings. During tyre inflation, compressed air is received in the first internal conduit 6 through said in-board end.

In the described embodiment, the outer and inner gaiter sidewalls 10, 11 are separable parts. When the gaiter 4 is not assembled to the driveshaft 2 and the stub axle 6, the inner sidewall 11 can be extracted from the gaiter 4 from the second, larger outer sidewall rim 16. However, it will be appreciated that alternative constructions are possible. For example, the inner sidewall 11 can be provided integrally with the outer sidewall 10. More specifically, the outer and inner sidewalls 10, 11 can be moulded together; or moulded separately and joined together.

The outer and inner sidewalls 10, 11 forming the sidewall structure 9 of the gaiter 4 are each made of flexible rubber or rubber-like material. The outer and inner sidewalls 10, 11 are convoluted. The convolutions of the inner sidewall 11 are located in correspondence with convolutions of the outer sidewall 10, thus allowing the passageway 24 to have a substantially constant flow cross-section.

In the described embodiment, both the outer and inner sidewalls 10, 11 are reinforced by metallic rings (not shown). Each metallic ring is located between two adjacent pleats. It will be understood, however, that many other manners of reinforcement are possible. For example, the outer and inner sidewalls 10, 11 could each have a core of 3D-woven fibres covered by a rubber matrix. An alternative would be to provide a metallic mesh around the profiles of each of the inner and outer sidewalls 11, 10. Since the inner and outer 11, 10 are reinforced, the flow of compressed air through the passageway 24 is less likely to cause changes of flow cross section in the passageway 24. Correspondingly, the outer sidewall 10 will be less likely to expand, and the enclosure 5 less likely to shrink or constrict around the inner components of the CV joint 1. Typically, the compressed air passes through the CV joint at a pressure between 2 to 7 bars. The purpose of the reinforced sidewalls 10, 11 is to withstand these pressures without substantial deformation.

Turning to the stub axle 3, the shaft portion 8 extends longitudinally from the cup shaped portion 18 along the main axis b-b. The cup shaped portion 18 is concave to allow suitable space for the inner CV joint parts. In the described embodiment, each of the galleries 40 extends through the cup-shaped portion 18, as shown in FIG. 1. Each gallery is a thin channel which allows passage of compressed air from the second fluid flow port 27 of the gaiter 4 to the second internal conduit 7. Although not shown in FIG. 1, the internal surface 23 of the cup shaped portion 18 is grooved. The grooves are provided to accommodate the bearing elements of the CV joint 1. Groove separation areas are therefore also defined. The groove separation areas are portions of the cup shaped portion 18 radially thicker than portions corresponding to the grooves. The thicker groove separation areas more naturally lend themselves to the formation of the galleries 40. In the described embodiment, one gallery 40 has been formed through the cup-shaped portion 18 in correspondence of each of the groove separation areas. The galleries 40 are formed during casting of the stub axle 3, for example using lost-wax techniques. Alternatively, the galleries 40 could be machined. It will be appreciated that the number of galleries 40 can change insofar as appropriate fluid communication is established between the passageway 24 and the second internal conduit 7. In the described embodiment, each gallery surfaces from the cup shaped portion 18 at an end surface 41 of the cup-shaped portion located at an in-board end 42 of the stub axle 3. Said end surface 41 is perpendicular to the axis b-b. Alternative configurations are possible, for example where each gallery surfaces on a designated external surface of the cup-shaped portion 18.

In the described embodiment, the sum of the cross-sectional areas of the galleries 40 corresponds substantially to the cross sectional area of the radial through bore 30 (it will be appreciated, however, that this feature is not accurately represented in FIG. 1). However, the galleries 40 may have a larger cross sectional area than the radial through bore 30 to mitigate against pressure losses and any unnecessary restrictions or obstructions in the flow path. This feature contributes to keeping the flow of compressed air unobstructed through the CV joint 1. Typically, the first and second conduits 6, 7 are sized to allow passage of air according to flow rates in the region of 30 liters per minute at a pressure of approximately 2 bar above atmospheric pressure. In the described embodiment, the diameter of the first conduit 6 is approximately 15 mm, and the diameter of the second conduit is approximately 8 mm. It will be appreciated, however, that the relative proportions of these two conduits are not accurately represented in FIG. 1.

While reference has been made above to tyre inflation operations, it will be appreciated that flow in the opposite direction is also possible during tyre deflation mode. When the tyre is deflated, air from the tyre flows back first through the second internal conduit 7, then through the enclosure passageway 24, and, finally, through the first internal conduit 6.

The CV joint 1 articulates in response to a driver steering input, i.e. the axes b-b and a-a can assume different relative angular orientations with respect to the one shown in FIG. 1.

The driveshaft 2 receives torque from a differential gearbox (not shown) and transmits said torque through the CV joint 1 to the wheel (not shown).

Compressed air can pass through the CV joint 1, in both directions, without contamination from the lubricant present in the enclosure 5, i.e. a compressed air supply line which bypasses the enclosure 5 is established through the CV joint 1.

Further aspects are set out in the following numbered paragraphs:

1. A gaiter for a lubricated joint, the gaiter comprising:
   an inner sidewall defining a volume for receiving a lubricated joint,
   an outer sidewall; and
   a passageway formed between the inner and outer sidewalls for conveying a gas; wherein the passageway is configured to convey gas in isolation from said volume when the gaiter is mounted to the lubricated joint.
2. A gaiter according to paragraph 1, wherein the passageway extends from a first gas flow port located at or near a first end of the gaiter.
3. A gaiter according to paragraph 2, wherein the passageway extends to a second gas flow port located at or near a second end of the gaiter.
4. A gaiter according to paragraph 23, wherein at least one of said gas flow ports is configured to receive the gas generally radially with respect to a longitudinal axis defined by the gaiter.
5. A gaiter according to paragraph 1, wherein the inner sidewall is removably disposed within the outer sidewall.
6. A gaiter according to paragraph 5, wherein at least one of the outer and inner sidewalls is convoluted.
7. A gaiter according to paragraph 6, wherein at least one of the outer and inner sidewalls is formed from a flexible polymeric material, optionally a rubber.
8. A gaiter according to paragraph 1, wherein at least one of the outer and inner sidewalls comprises a sidewall reinforcing element.
9. A gaiter according to paragraph 1, wherein the outer and inner sidewalls are at least substantially coaxially disposed.
10. A hollow vehicle axle shaft for a central tyre inflation system (CTIS), the shaft comprising:
    a conduit for passage of a gas extending longitudinally through said shaft;
    a shaft outer wall;
    wherein a through bore is provided through said shaft outer wall, said bore being in fluid communication with the conduit.
11. A shaft according to paragraph 10, wherein the bore extends at least substantially radially through said shaft outer wall.
12. A shaft according to paragraph 10, wherein said shaft is a driveshaft.
13. A hollow wheel stub axle for a central tyre inflation system (CTIS), the stub axle comprising:
    a cup-shaped portion; and
    a shaft portion comprising a conduit for passage of a gas extending longitudinally through said shaft portion;
    wherein the cup-shaped portion comprises a gallery for receiving the gas, the gallery being in fluid communication with said conduit.
14. A stub axle according to paragraph 13, wherein said gallery is configured to receive the gas substantially parallel with respect to said shaft portion.
15. A stub axle according to paragraph 13, wherein said gallery extends through a rim region defined by said cup-shaped portion.
16. A stub axle according to paragraph 15, said rim region comprising longitudinally extending bearing grooves separated by groove separation areas, a radial thickness of said rim region measured in correspondence of said groove separation areas being greater than a radial thickness of said rim region measured in correspondence of at least one of the bearing grooves, wherein said gallery extends at least partially through one of said groove separation areas.

17. A stub axle according to paragraph 16, the cup-shaped portion comprising a plurality of galleries each extending through a corresponding groove separation area.

18. A vehicle axle assembly for a central tyre inflation system (CTIS), the assembly comprising:
a gaiter according to paragraph 1; and
a hollow vehicle axle shaft according to paragraph 10.

19. An assembly according to paragraph 18, wherein the passageway is in fluid communication with the through bore.

20. An assembly according to paragraph 19, wherein the outer sidewall comprises an outer sidewall first rim mounted to a first outer surface of the shaft, the inner sidewall comprises an inner sidewall first rim mounted to a second outer surface of said shaft, the through bore being located between said first and second surfaces.

21. An assembly according to paragraph 19, wherein the outer sidewall and the inner sidewall form a first cuff comprising a first rim mounted to an outer surface of the shaft, said through bore being located on said outer surface.

22. A vehicle axle assembly for a central tyre inflation system (CTIS), the assembly comprising:
a gaiter according to paragraph 1; and
a hollow wheel stub axle according to paragraph 13.

23. An assembly according to paragraph 22, wherein the passageway is in fluid communication with the or each gallery.

24. An assembly according to paragraph 23, wherein the outer sidewall cooperates with a first surface of the cup-shaped portion of the stub axle, and the inner sidewall cooperates with a second surface of the cup-shaped portion of the stub axle.

25. An assembly according to paragraph 24, wherein said first surface is external.

26. An articulated joint for a central tyre inflation system (CTIS), the joint comprising:
first and second hollow vehicle axles having, respectively, a first and a second
internal conduit for passage of a gas; and
a gaiter according to paragraph 1.

27. An articulated joint according to paragraph 26, wherein the passageway is in fluid communication with each of the first and second internal conduits.

28. An articulated joint according to paragraph 27 wherein the first hollow vehicle axle is a driveshaft, the second hollow vehicle axle is a wheel stub axle, and said vehicle driveshaft and wheel said stub axle form a constant velocity (CV) joint.

29. A CTIS comprising a hollow vehicle axle shaft according to paragraph 10, and/or a hollow wheel stub axle according to paragraph 13, and/or a vehicle axle assembly according to paragraph 18, and/or an articulated joint according to paragraph 26.

The invention claimed is:
1. A gaiter for a lubricated joint, the gaiter comprising:
an inner sidewall defining a volume for receiving a lubricated joint,
an outer sidewall; and
a passageway formed between the inner and outer sidewalls for conveying a gas;
wherein the passageway is configured to convey gas in isolation from said volume when the gaiter is mounted to the lubricated joint, and wherein the passageway extends from a first gas flow port located at or near a first end of the gaiter to a second gas flow port located at or near a second end of the gaiter.

2. The gaiter of claim 1, wherein at least one of the first and second gas flow ports is configured to receive the gas generally radially with respect to a longitudinal axis defined by the gaiter.

3. The gaiter of claim 1, wherein the inner sidewall is removably disposed within the outer sidewall.

4. The gaiter of claim 3, wherein at least one of the outer and inner sidewalls is convoluted, and wherein at least one of the outer and inner sidewalls is formed from a flexible polymeric material.

5. The gaiter of claim 1, wherein at least one of the outer and inner sidewalls comprises a sidewall reinforcing element.

6. The gaiter of claim 1, wherein the outer and inner sidewalls are at least substantially coaxially disposed.

7. A vehicle axle assembly for a central tyre inflation system (CTIS), the assembly comprising:
the gaiter of claim 1; and
a hollow vehicle axle shaft comprising a conduit for passage of a gas extending longitudinally through the shaft;
wherein a through bore is provided through an outer wall of the shaft, and wherein the through bore is in fluid communication with the conduit.

8. The assembly of claim 7, wherein the passageway is in fluid communication with the through bore.

9. The assembly of claim 8, wherein the outer sidewall comprises an outer sidewall first rim mounted to a first outer surface of the vehicle axle shaft, wherein the inner sidewall comprises an inner sidewall first rim mounted to a second outer surface of the vehicle axle shaft, and wherein the through bore is located between the first and second outer surfaces.

10. The assembly of claim 8, wherein the outer sidewall and the inner sidewall form a first cuff comprising a first rim mounted to an outer surface of the vehicle axle shaft, wherein the through bore is located on the outer surface.

11. A vehicle axle assembly for a central tyre inflation system (CTIS), the assembly comprising:
the gaiter of claim 1; and
a hollow wheel stub axle comprising a cup-shaped portion; and
a shaft portion comprising a conduit for passage of a gas extending longitudinally through the shaft portion, wherein the cup-shaped portion comprises a gallery for receiving the gas, wherein the gallery is in fluid communication with the conduit.

12. The assembly of claim 11, wherein the passageway is in fluid communication with the gallery.

13. The assembly of claim 12, wherein the outer sidewall cooperates with a first surface of the cup-shaped portion of the stub axle, and the inner sidewall cooperates with a second surface of the cup-shaped portion of the stub axle, and wherein the first surface is external.

14. A vehicle comprising the of claim 1.

15. An articulated joint for a central tyre inflation system (CTIS), the joint comprising:
first and second hollow vehicle axles having, respectively, a first and a second internal conduit for passage of a gas; and
a gaiter comprising:
an inner sidewall defining a volume for receiving a lubricated joint, an outer sidewall; and a passageway formed between the inner and outer sidewalls for conveying a gas, wherein the passageway is configured to convey gas in isolation from the volume when the gaiter is mounted to the lubricated joint and wherein the passageway extends from a first gas flow port located at or near a first end of the gaiter to a second gas flow port located at or near a second end of the gaiter.

16. The articulated joint of claim 15, wherein the passageway is in fluid communication with each of the first and second internal conduits.

17. The articulated joint of claim 16, wherein the first hollow vehicle axle is a driveshaft, the second hollow vehicle axle is a wheel stub axle, and wherein the vehicle driveshaft and wheel stub axle form a constant velocity (CV) joint.

\* \* \* \* \*